(12) United States Patent
Gebow et al.

(10) Patent No.: US 6,796,154 B2
(45) Date of Patent: Sep. 28, 2004

(54) TRAILER WHEEL LOCK

(76) Inventors: Chad Gebow, 1457 Summit Dr., Bullhead City, AZ (US) 86442; Gerald D. Wagner, 1800 Clubhouse Dr., #107, Bullhead City, AZ (US) 86442

( * ) Notice: Subject to any disclaimer, the term of this patent is extended or adjusted under 35 U.S.C. 154(b) by 0 days.

(21) Appl. No.: 10/677,288

(22) Filed: Oct. 3, 2003

(65) Prior Publication Data
US 2004/0089036 A1 May 13, 2004

Related U.S. Application Data
(60) Provisional application No. 60/425,747, filed on Nov. 13, 2002.

(51) Int. Cl.[7] .............................................. B60R 25/00
(52) U.S. Cl. ............................... 70/226; 70/34; 70/227; 70/237; 188/265
(58) Field of Search ................... 70/34, 237, 225–228; 188/31, 60, 265

(56) References Cited

U.S. PATENT DOCUMENTS

| | | | | |
|---|---|---|---|---|
| 1,194,034 A | * | 8/1916 | Koch | 70/227 |
| 1,307,161 A | * | 6/1919 | Stubblefield | 70/226 |
| 1,401,971 A | * | 1/1922 | Elliott | 70/15 |
| 1,504,220 A | * | 8/1924 | Herman | 70/227 |
| 1,809,003 A | * | 6/1931 | Van Vorst | 188/31 |
| 4,236,395 A | * | 12/1980 | Avaiusini | 70/34 |
| 4,576,021 A | * | 3/1986 | Holden | 70/34 |
| 4,622,833 A | * | 11/1986 | Shepherd | 70/226 |
| 4,666,106 A | * | 5/1987 | Kohout | 244/129.3 |
| 4,760,719 A | * | 8/1988 | Evans et al. | 70/18 |
| 4,878,366 A | | 11/1989 | Cox | 70/14 |
| 5,315,848 A | | 5/1994 | Beyer | 70/18 |
| 5,372,018 A | | 12/1994 | Smith | 70/18 |
| 5,375,442 A | | 12/1994 | Hammer | 70/226 |
| 5,463,885 A | | 11/1995 | Warren, Sr. | 70/18 |
| 5,520,034 A | | 5/1996 | Edmondson | 70/226 |
| 5,787,742 A | | 8/1998 | Lewis et al. | 70/209 |
| 5,899,101 A | * | 5/1999 | West | 70/238 |
| 5,927,108 A | | 7/1999 | Pierce | 70/19 |
| 6,073,470 A | * | 6/2000 | Burnitzki et al. | 70/226 |
| 6,360,571 B1 | | 3/2002 | O'Neal | 70/226 |
| 6,672,115 B2 | * | 1/2004 | Wyers | 70/14 |

FOREIGN PATENT DOCUMENTS

| | | | | |
|---|---|---|---|---|
| DE | 341453 | * | 10/1921 | 70/227 |
| FR | 506328 | * | 8/1920 | 70/226 |
| FR | 597373 | * | 11/1925 | 70/227 |
| GB | 15982 | * | 7/1909 | 70/227 |
| GB | 144159 | * | 6/1920 | 70/227 |
| GB | 2233616 | * | 1/1991 | 70/237 |

* cited by examiner

Primary Examiner—Lloyd A. Gall
(74) Attorney, Agent, or Firm—Richard C. Litman

(57) ABSTRACT

The trailer wheel locking device to prevent rotation of a set of wheels on a common axle has an elongated rod in which one end has a stop and a second end having an annular groove defined therein for receiving a locking mechanism. The length of the rod spans the width of the vehicle, thereby spanning the wheels on the common axle being locked. The device is installed by passing the rod through the openings of the wheels and includes two movable washers placed on the rod at opposite ends in order to prevent the device from passing through the wheel openings.

8 Claims, 7 Drawing Sheets

TRAILER WHEEL LOCK

CROSS-REFERENCE TO RELATED APPLICATION

This application claims the benefit of U.S. Provisional Patent Application Ser. No. 60/425,747, filed Nov. 13, 2002.

BACKGROUND OF THE INVENTION

1. Field of the Invention

The present invention relates to vehicle locking devices. More particularly, the present invention relates to vehicle wheel locking devices for trailers.

2. Description of the Related Art

Various kinds of locking devices for use on vehicles, such as trailers, are known. Most often, these devices encircle one or more wheels, requiring effort to ensure that the device is seated securely on the wheel(s). There is a need, however, for a device that is more easily installed than such wheel-encircling devices, i.e., a device that is installed simply by inserting the device through openings in a pair of opposed wheels.

U.S. Pat. No. 4,878,366, issued to Cox on Nov. 7, 1989, teaches a U-shaped wheel clamp which spans a chord of a wheel and which is secured by a padlock with a shackle inserted through a hasp. U.S. Pat. No. 5,315,848, issued to Beyer on May 31, 1994, teaches a wheel lock for locking a steering wheel or a road wheel that has two opposing L-shaped members adjustably positioned on a transverse cross member. U.S. Pat. No. 5,372,018, issued to Smith on Dec. 13, 1994, teaches a single-wheel locking device.

U.S. Pat. No. 5,375,442, issued to Hammer on Dec. 27, 1994, also teaches a single wheel locking device. U.S. Pat. No. 5,463,885, issued to Warren, Sr. on Nov. 7, 1995, teaches a trailer wheel locking device using a chain. U.S. Pat. No. 5,520,034, issued to Edmondson on May 28, 1996, teaches a single wheel lock in which the spanning bar includes a series of holes on which a standard padlock is applied.

U.S. Pat. No. 5,787,742, issued to Lewis et al. on Aug. 4, 1998, teaches a vehicle wheel locking device that is passed through the openings or spokes of a single wheel using an elongated spanning bar having flanges on the ends of the bar. The device uses a bar lock. The device is a complex structure including rods of different diameters.

U.S. Pat. No. 5,927,108, issued to Pierce on Jul. 27, 1999, teaches a wheel locking device including adjustable hooks and wheel chocks. U.S. Pat. No. 6,360,571, issued to O'Neal on Mar. 26, 2002, teaches several wheel locking devices, including one in FIG. 7 having an elongated rod with a transverse plate at one end of the rod, and a three piece locking mechanism attachable to the opposite end of the rod, the locking mechanism including a lock housing, an elongated lock pin inserted through a side of the lock housing and transversely through a hole defined in the rod, and a lock sleeve inserted through the opposite side of the housing and frictionally engaging the opposite end of the lock pin. O'Neal does not teach extending the rod through opposing wheels of the vehicle, and does not teach an annular groove about an end of the rod, and does not teach a key lock for securing the wheel lock to the vehicle.

None of the above inventions and patents, taken either singly or in combination, is seen to describe the instant invention as claimed. Thus, a trailer wheel lock solving the aforementioned problems is desired.

SUMMARY OF THE INVENTION

The inventive trailer wheel locking device has an elongated rod that is passed through the openings of at least two wheels on a common axle to prevent wheel rotation, thereby preventing theft of the vehicle. The elongated rod has a permanent stop fastened at one end and is inserted into a locking mechanism at the opposite end. When the opposite end of the rod is inserted into the locking mechanism, a latch pin in the locking mechanism engages a notch or annular groove formed in the end of the rod, thereby locking the device. The locking mechanism is key operated.

Two washers are provided of appropriate size which are movable along the rod, one located at the stop end and the other mounted end so as to bear on the outer side of the respective wheels. The washers are provided in a diameter which prevents the stop and the lock from travel through the openings. The rod prevents rotation of the trailer wheels, thereby preventing movement of the vehicle. In another embodiment, a thrust washer is mounted outside the head end washer which fits in a groove in the rod and has a seat on the outer surface of the washer for receiving the lock housing.

Accordingly, it is a principal object of the invention to provide a trailer wheel locking device having an elongated rod with a stop at one end and a locking mechanism at the opposite end, the rod being inserted through openings defined in opposing wheels of the trailer.

It is an other object of the invention to provide a trailer wheel locking device having an elongated rod with an annular groove defined about one end of the rod for receiving a latch pin of a locking mechanism which slides over the end of the rod.

It is yet another object of the invention to provide a wheel locking device as above having a thrust washer having a seat therein for seating the locking mechanism therein.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a trailer wheel locking device used in trailers equipped with modular wheels having openings in the wheel centers through which a rod may be inserted.

Figure 1:
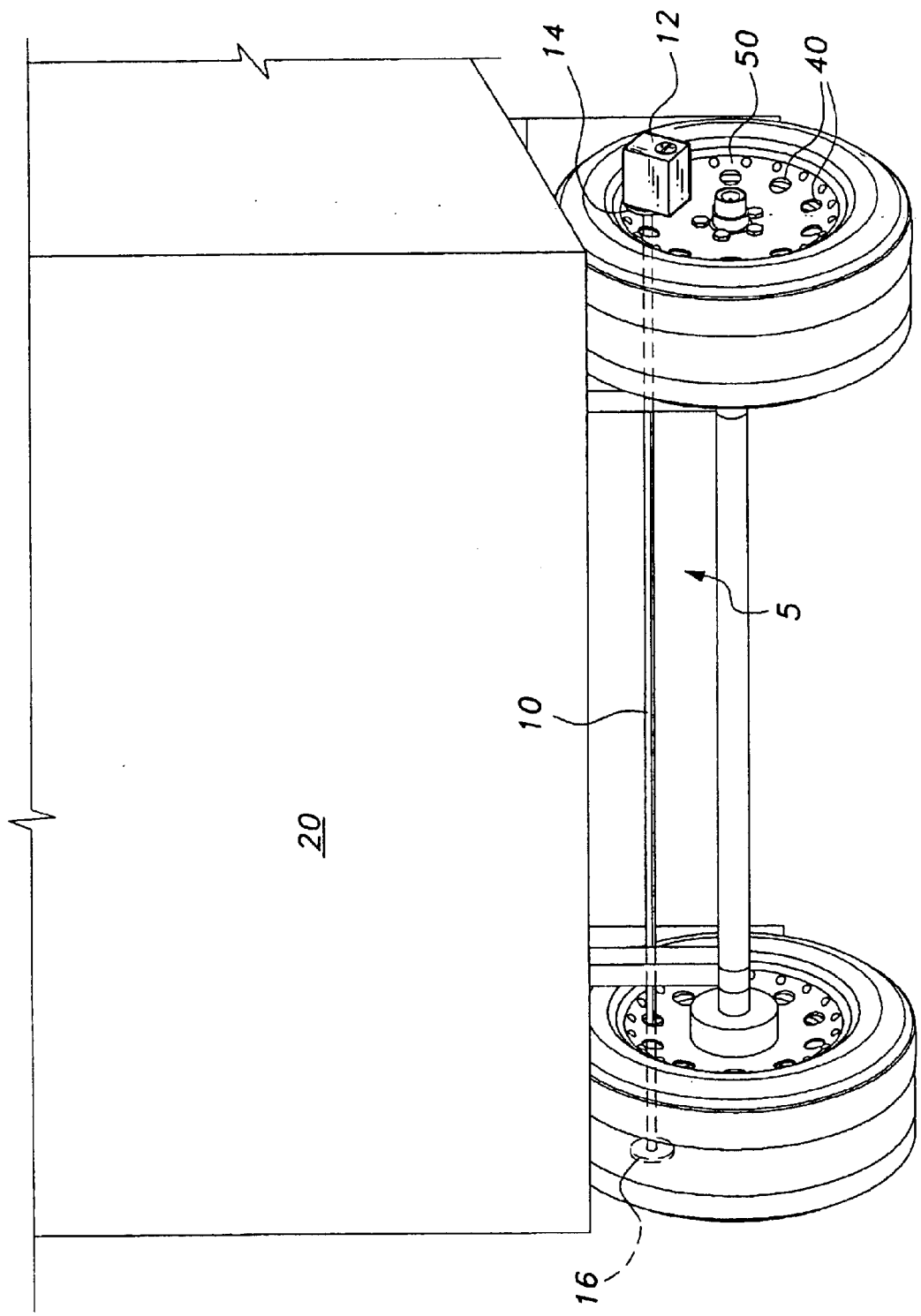
FIG. 1 is an environmental, perspective view of a trailer wheel locking device according to the present invention.

Referring to FIG. 1, there is shown the inventive wheel locking device 5 installed on a trailer, thereby preventing wheel rotation and, therefore, preventing theft of the trailer 20. The trailer wheels 50 are modular in construction, having a series of openings 40 defined therein. The rod 10 of the locking device 5 spans the width of the trailer through the wheel openings shown.

Figure 2:
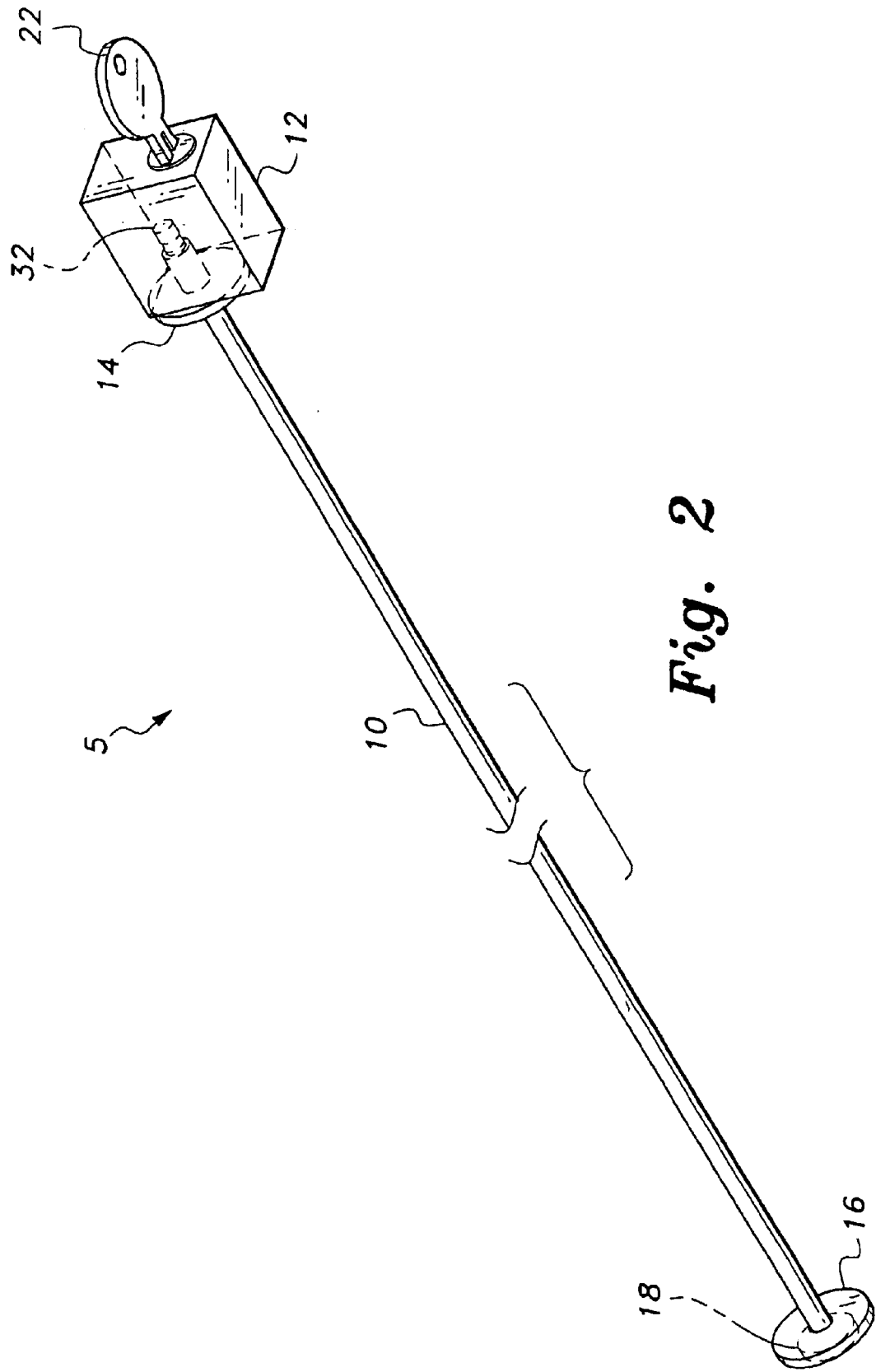
FIG. 2 is a fragmented perspective view of the trailer wheel locking device according to the present invention.
Figure 3:
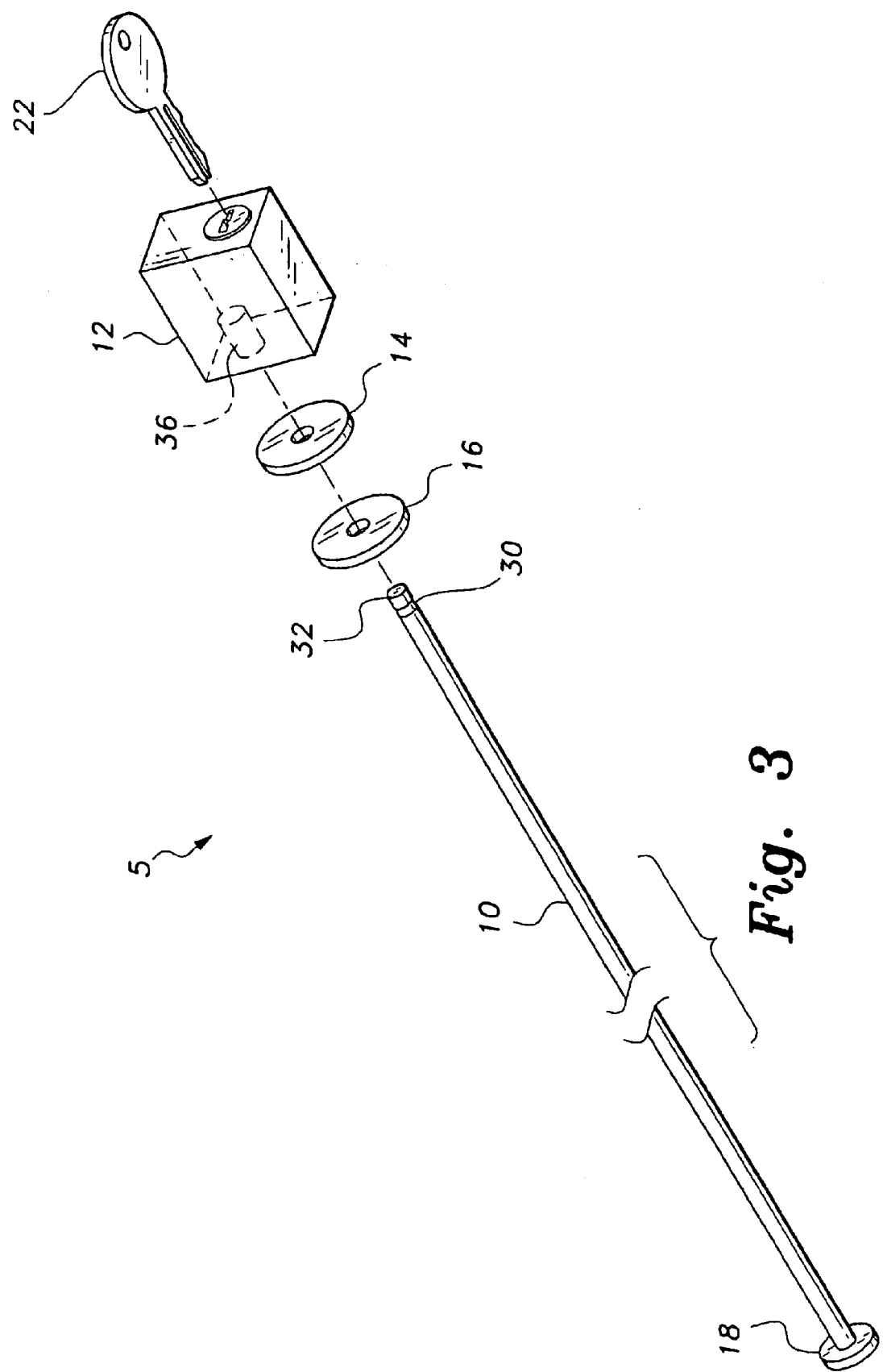
FIG. 3 is an exploded view of the trailer wheel locking device of FIG. 1.

Details of the locking device are shown in FIGS. 2 and 3, in assembled and exploded views, respectively. The rod 10 has a sufficient length to span a set of wheels on a common axle. At one end of the rod 10 a stop 18, e.g., a disk or plate, is permanently fastened to the rod 10, e.g., by welding. A movable annular disc (i.e., a washer) 16 is slid onto the rod 10 and placed against the permanent stop 18. The movable end washer 16 is dimensioned to ensure that the end stop 18 is prevented from passing through the opening 40 in the wheel 50.

At the opposite end of the rod 10, the end of the rod 32 is modified to include an annular groove or notch 30 defined about the circumference of rod 10. The annular groove 30 defines a head 32 at the end of the rod 10. A rod receiving lock 12 has a housing enclosing a cylinder lock having an inner end and an outer end, the inner end having an aperture 36 defined in the housing sized and dimensioned for receiving the head portion of rod 10, the housing outer end receiving a key for operating the lock 12. In this design, no external parts are accessible to thieves or vandals, except for the key opening. When the head 32 is inserted into the aperture 36 of the lock mechanism 12, a latch pin inside the housing of lock 12 engages the annular groove 30 in a well known manner to lock the rod 10 onto the opposing wheel 50 of the trailer 20. A key 22 is used to open the lock when needed.

A second washer 14 is movable on the rod and is sufficiently sized to prevent the lock casing from passing through the corresponding opening 40 of the wheel 50.

The two washers 14 and 16 are dimensioned to be larger than the openings 40 in the wheels 50, thereby ensuring a secure installation.

Figure 4A:
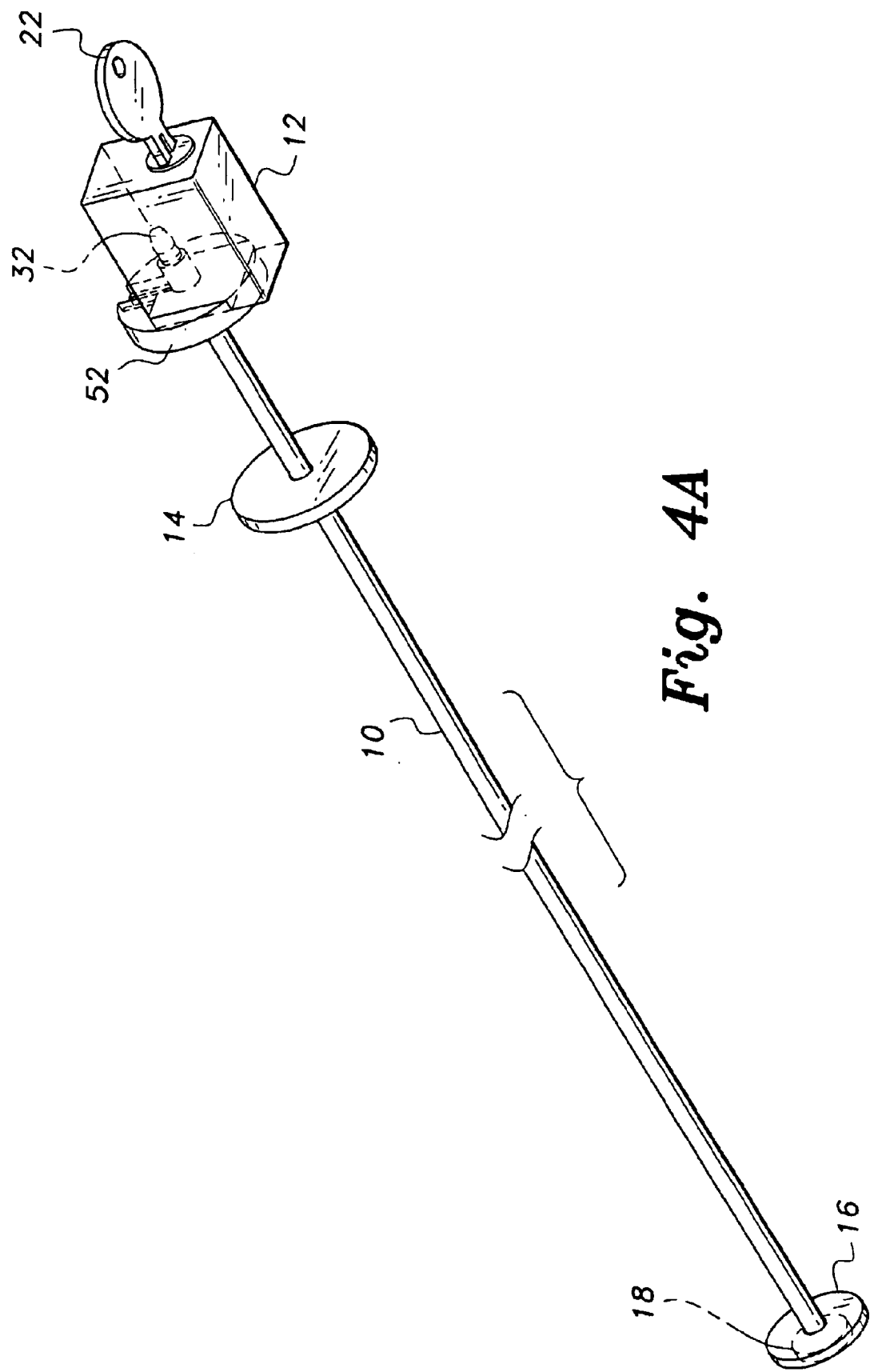
FIG. 4A is a perspective view of another embodiment of the present invention.
Figure 4B:
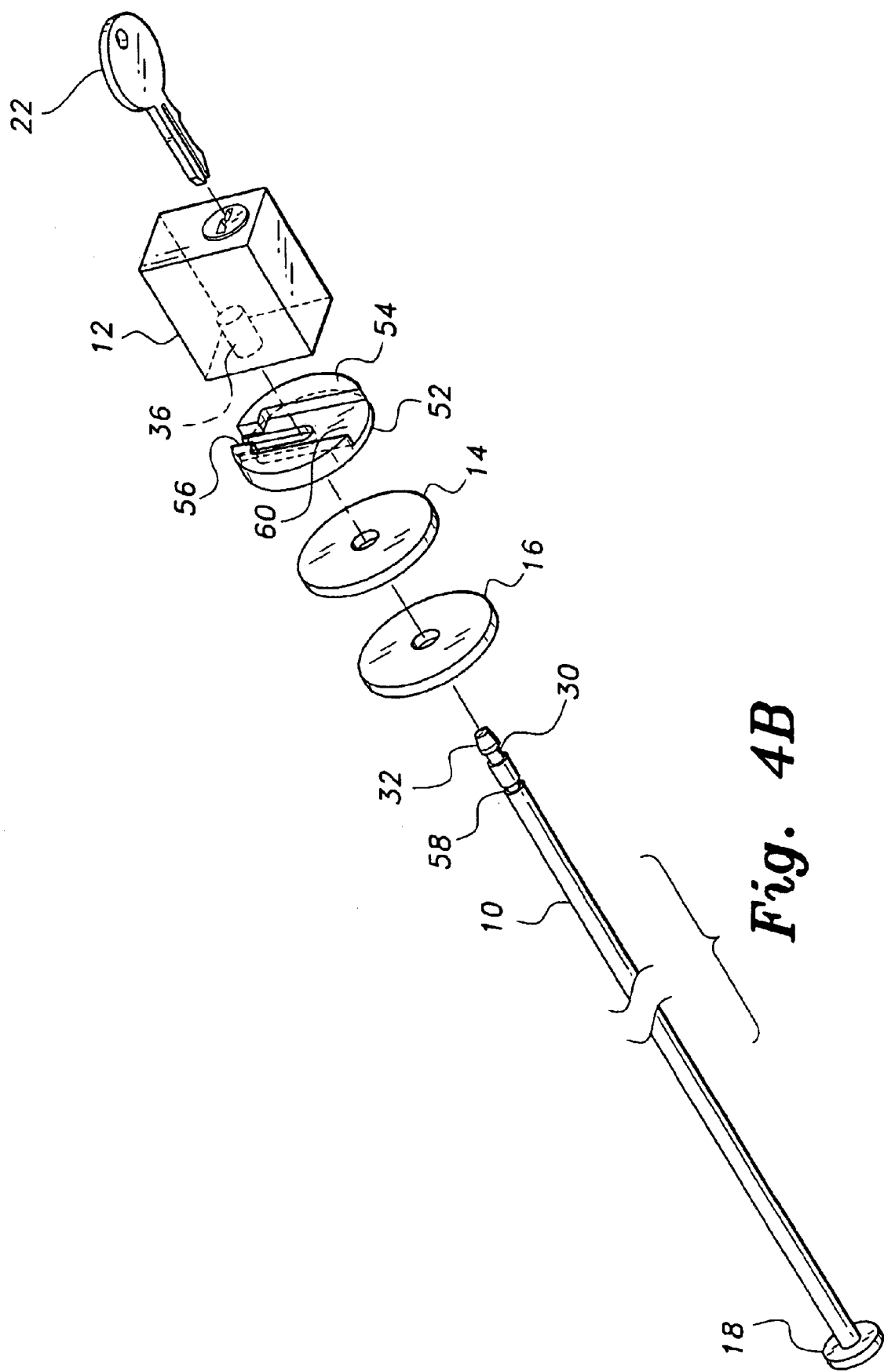
FIG. 4B is an exploded view of the invention of FIG. 4.

Referring to FIGS. 4A–7, there is shown another embodiment of the invention wherein a thrust washer is added at the head end of the rod having a seat for securing the lock in a desired position. Referring more particularly to FIGS. 4A and 4B there is shown a perspective and an exploded view of the trailer wheel locking device 5 with a thrust washer 52 mounted on rod 10 at receiving groove 58 between washer 14 and lock 12. Thrust washer 52 has an outer face 54 and a radial mounting slot 56 for sliding thrust washer 52 into thrust washer receiving groove 58.

Figure 5:
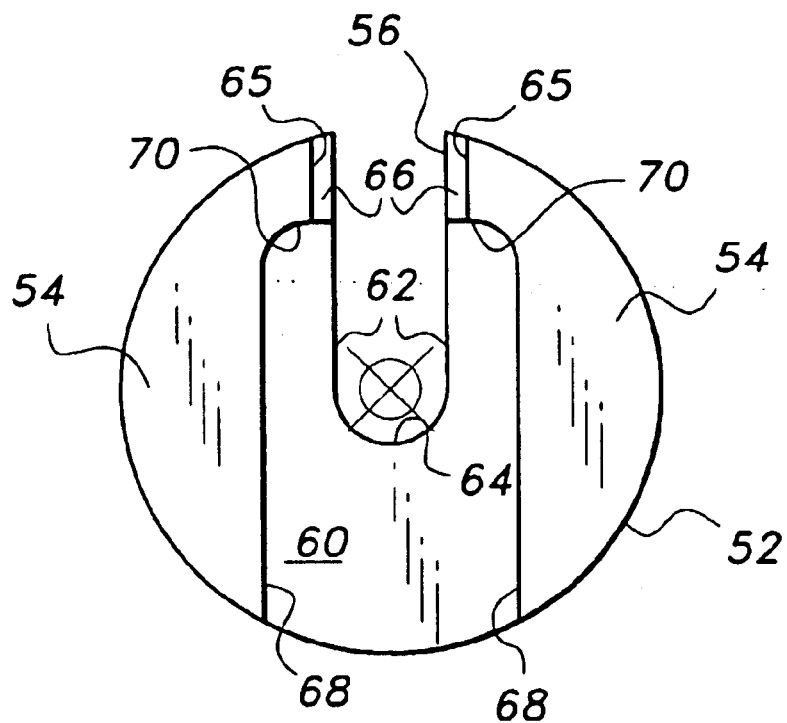
FIG. 5 is a plan view of the thrust washer and locking mechanism seat of FIG. 4A.
Figure 6:
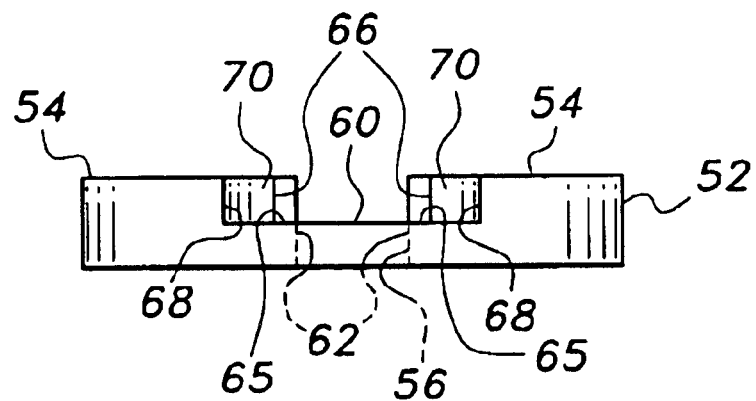
FIG. 6 is an end view of the thrust washer and locking mechanism device seat of FIG. 4A.
Figure 7:
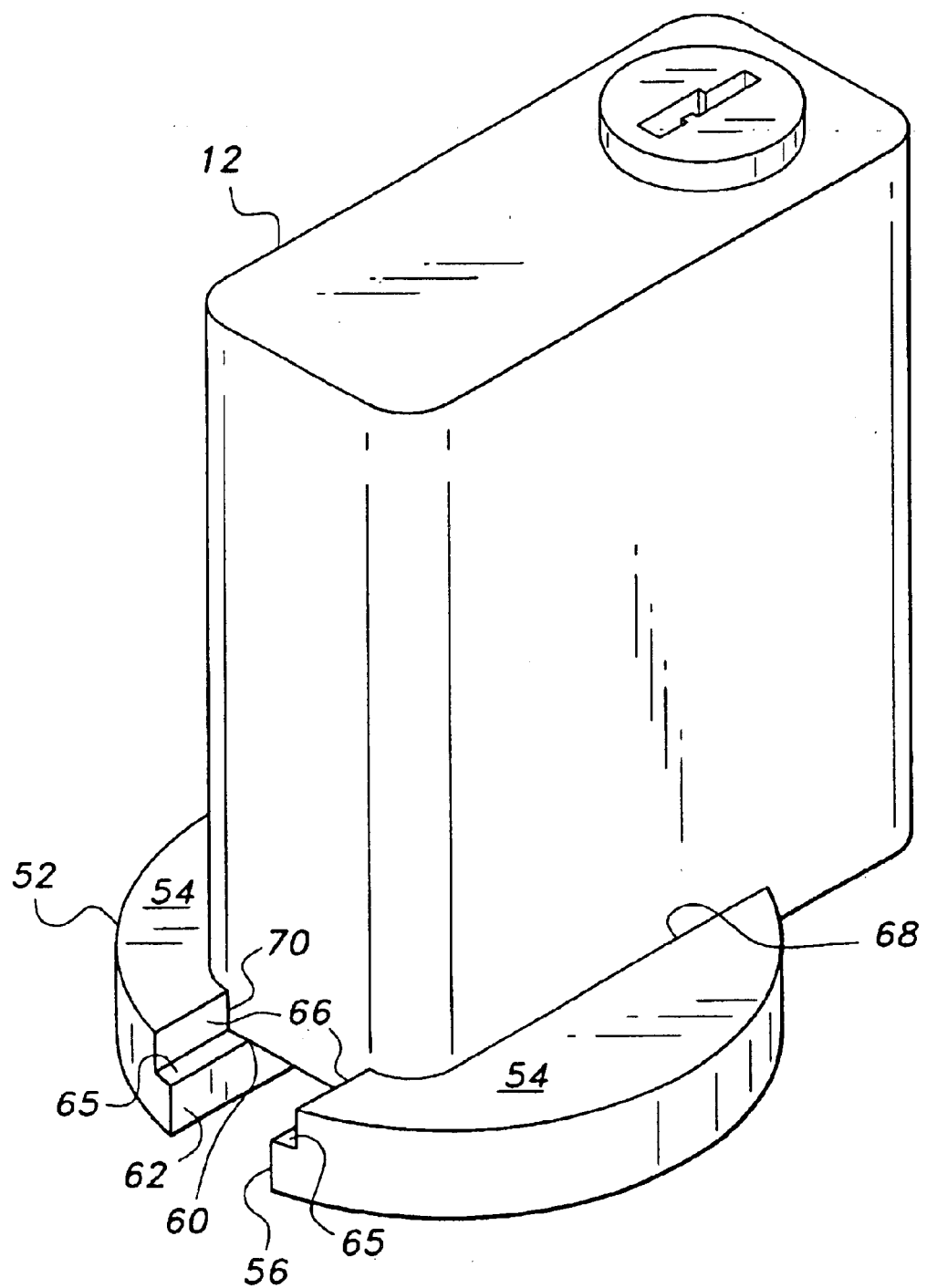
FIG. 7 is a detail view of the locking device seated in the thrust washer and locking device seat as in FIG. 4A.

A lock seat recess 60 is cut in thrust washer 52 through outer face 54 for receiving the housing of lock 12(see FIG. 7). FIGS. 5–7 show the thrust washer 52 in more detail. Thrust washer 52 is circular in shape and has an outer face 54 and a radial mounting slot 56 having side walls 62 and a semi-circular center wall 64 sized to fit within thrust washer receiving groove 58 in rod 10. A lock seat recess 60 extends radially from an intermediate point along mounting slot 56 to the opposite periphery of thrust washer 52. Lock seat recess 60 has sidewalls 68 and end walls 70 and the surface thereof extends along the length of mounting slot 56 forming grooves 65 between mounting slot groove walls 66.

Lock seat recess 60 extends inward to about half the thickness of thrust washer 52 and has a seating surface parallel with the outer wall of the thrust washer, the remaining thickness being such as to fit within thrust washer receiving groove 58 of rod 10. The width of mounting slot 56 is such as to be received within receiving groove 58, and the slot semi-circular center wall 64 is located such as to be received within receiving groove 58 at a point such that thrust washer 52 is axially mounted on rod 10. The distance between mounting slot groove walls 66 is such as to clear rod 10 when thrust washer 52 is mounted in receiving groove 58.

In operation, trail wheel lock assembly 5 is installed by sliding washer 16 onto rod 10 to rest against permanent stop 18. The rod 10 is inserted through corresponding openings in wheels installed on opposite ends of a common axle. Another washer 14 is installed over the head end of the rod 10 and slid along rod 10 to rest against the outer side of the wheel. The lock 12 is locked over the head end 32 of the rod 12. In the case of modular wheels there is customarily a circle of relatively small openings spaced inward from the rim of the wheel and no washers are necessary for installation as long as the stop 10 and the lock 12 are larger than the openings. Alternatively, washers 16 and 14 may be relatively small in diameter. In the case of spoked wheels, the rod is inserted between the spokes and larger diameter washers 16 and 14 may be necessary to assure that the assembly cannot be pulled through the wheels between the spokes.

In the second embodiment, the rod 10 has a circumferential thrust washer receiving groove 58 spaced from the head end 32 of rod 10. After installation of the rod 10 and washers 16 and 14, thrust washer 52 is installed on rod 10 over groove 58 by sliding along radial mounting slot 56 until centered against semi-circular center wall 64 which fits into receiving groove 58. The housing of lock 12 is then installed on the head of rod 10 by means of lock aperture 36 and the inner end of the housing seated into corresponding lock seat 60 of thrust washer 52 and then secured by turning a key, thereby locking lock 12 onto rod head end 32.

The spacing between receiving groove 58 and head 32 is such that the inner end of the housing of lock 12 is seated in lock seat recess 60 of thrust washer 52 when lock 12 is locked in place over head 32. In the locked condition, the trailer cannot be moved by rolling the wheels. The trailer may be unlocked by reversing the described steps and removing the rod from the trailer wheels.

The rod material can be any material having suitable strength, and is preferably from ⅝ inch to 1 inch diameter stainless steel rod. The depth of the thrust washer receiving groove is about 3/16 inch and the width about ⅜ inch. The overall thickness of the thrust washer is about ¾ inch. The thickness of the first and second washers is about ½ inch and they may be of any desired diameter. The stop 18 and the washers 14 and 16 are made of any material having suitable strength and preferably are stainless steel washers. The washers are of a size as that their center bores for a sliding fit over the rod and are preferably circular in overall shape, however other shapes are contemplated such as triangular or square. The rod is preferably provided in one of four different lengths ranging from 55 inches to 108 inches, depending upon vehicle size, but can be custom built to length as needed.

The lock 12 is a conventional rod receiver sliding lock, and may have a pin tumbler, wafer disc, or any other conventional internal mechanism within the housing. Advantageously, the lock 12 is not of the padlock variety, and, therefore does not have any exposed shackle, and presents more of a deterrent to thieves and vandals. A lock useful with the present invention is the Gorilla Guard™ Receiver Lock, commercially available from Fulton Performance Products, Mosinee, Wisconsin.

It is to be understood that the present invention is not limited to the embodiments described above, but encompasses any and all embodiments within the scope of the following claims.

We claim:

1. A trailer wheel lock device comprising:

an elongated rod having a head end and a second end, said rod being sized and dimensioned for extending through openings defined in wheels disposed at opposite ends of a trailer axle, said rod having an annular groove for engaging a latch pin of a lock defined about the rod at said head end, said groove defining a head;

a stop located at said second end of said rod;

a rod receiving lock having a housing having an inner end and an outer end, said inner end having an opening defined therein dimensioned and configured for receiving said head end of the rod and engaging said head for locking over said head; and a thrust washer having a radial mounting slot for axially mounting said thrust washer on said rod, said rod having a receiving groove spaced from said rod head so sized as to receive said thrust washed;

wherein said rod is adapted for insertion through corresponding openings in a pair of trailer wheels on opposite ends of a trailer axle with the stop abutting one of the wheels and a lock mechanism attached to the head end of the rod so as to abut the other of said wheels so as to lock the trailer wheels against rotation.

2. The trailer wheel locking device according to claim 1, further comprising a first washer disposed on said rod and located at said second end of said rod abutting said stop for preventing the second end of said rod from passing through an opening in a trailer wheel.

3. The trailer wheel locking device according to claim 2, further comprising a second washer disposed on the head end of said rod for bearing against a trailer wheel.

4. The trailer wheel locking device according to claim 1, said thrust washer having an outer face having a lock seat recess therein for receiving an inner portion of the housing of said receiver receiving lock.

5. The trailer wheel locking device according to claim 4, wherein said thrust washer receiving groove in said rod is spaced from said head a length such that the inner end of said lock is seated in said lock seat recess when said lock is engaged with said rod head.

6. The trailer wheel locking device according to claim 5, wherein said lock seat recess extends radially from an intermediate point along said mounting slot to the opposite periphery of said thrust washer.

7. The trailer wheel locking device according to claim 6, wherein said lock seat recess extends about half the thickness of said thrust washer, forming a surface parallel with said thrust washer outer face.

8. The trailer wheel locking device according to claim 7, wherein said lock seat recess surface extends along the length of said mounting slot, forming grooves therein having groove walls separated by a distance such as to fit over said rod when said thrust washer is installed in said thrust washer receiving groove.

* * * * *